United States Patent [19]

Oligny

[11] Patent Number: 5,130,006
[45] Date of Patent: Jul. 14, 1992

[54] PYRAMIDAL SHAPED ELECTROLYSIS CELL

[76] Inventor: Louis-André Oligny, 743, Rue Mathieu, Terrebonne, Quebec, Canada, J6W 2X5

[21] Appl. No.: 434,932

[22] Filed: Nov. 9, 1989

[51] Int. Cl.[5] .......................... C25B 1/10; C25B 9/00; C25B 15/08
[52] U.S. Cl. ................................. 204/231; 204/237; 204/252; 204/261; 204/262; 204/263; 204/266
[58] Field of Search .............. 204/231, 252, 263-266, 204/261-262, DIG. 5, 129, 256, 258

[56] References Cited

U.S. PATENT DOCUMENTS

| | | | |
|---|---|---|---|
| 1,263,314 | 4/1918 | Emanuel | 204/278 |
| 2,786,811 | 3/1957 | Swope | 204/256 |
| 3,135,674 | 6/1964 | Ruetschi | 204/252 X |
| 3,981,787 | 9/1976 | James et al. | 204/252 |
| 4,169,035 | 9/1979 | Stummer et al. | 204/263 X |
| 4,169,775 | 10/1979 | Kuo | 204/248 X |
| 4,214,964 | 7/1980 | Cannell | 204/261 X |
| 4,950,370 | 8/1990 | Tarancon | 204/129 X |

*Primary Examiner*—Donald R. Valentine
*Attorney, Agent, or Firm*—Darby & Darby

[57] ABSTRACT

An apparatus for the electrolysis of a solution of electrolysis, comprising an anode compartment and a cathode compartment separated by a membrane, in which the external shape of the apparatus is that of a pyramid and the membrane separating both the anode and cathode compartments is oriented according to a diagonal line perpendicular to the base of the pyramid.

20 Claims, 2 Drawing Sheets

PYRAMIDAL SHAPED ELECTROLYSIS CELL

BACKGROUND OF THE INVENTION

This invention relates to a new apparatus comprising an electrolysis cell for electrolysis of water and other electrolytes, made of a cathode compartment and an anode compartment separated by a membrane.

The apparatus is characterized in that its external shape is that of a pyramid and in that the membrane separating both compartments is orientated according to a diagonal line, perpendicular to the base of the pyramid.

The electrolysis of water in an electrolytic cell containing an aqueous solution of sodium sulfate or potassium hydroxyde has been known for numerous years and used on a large scale by the most important chemical industries for the production of pure hydrogen and oxygen gases.

The main disadvantage associated with the most commonly used electrolytic cells consists in that they cannot be supplied with a voltage above 5 V, at the risk of corroding the electrodes and polluting the electrolyte solution with the metallic particules teared off by the high voltage current.

It would most certainly be to the best advantage of the chemical industries if an electrolysis cell allowing the use of voltages above 5 V without any rise of corrosion of the electrodes or pollution of the electrolyte solution existed. To this date, such a cell has not yet been conceived.

SUMMARY OF THE INVENTION

The object of the present invention is to build a new model of electrolytic cell capable of producing oxygen and hydrogen on an industrial basis.

According to a first and most advantageous embodiment of the invention, the apparatus is characterized in that its external shape is that of a pyramid and in that the membrane separating both the anode and cathode compartments is oriented according to a diagonal line, perpendicular to the base of the pyramid.

According to another embodiment of the invention, the membrane separating both compartments is oriented relatively to the earth cardinal points in such a way that the membrane is in a North-South axis, the anode being situated on the west side and the cathode on the east side.

According to a further embodiment of the invention, the apparatus is equipped with a current supply means for each electrode. This current supply means is a lead-in wire reaching the electrode at a ninety degree angle.

Preferably, the lead-in wire is made of three distinct parts, each of which is connected to the electrode at points defining an inverted triangle.

According to another embodiment of the invention, the apparatus is provided with a small copper counter-electrode located behind the cathode.

The characteristic orientation of the pyramid makes use of the earth magnetic field and spin to enhance the electrolysis reaction, while creating particularly strong fields inside the pyramid. This new asset makes it possible to use a current density of $9A/in^2$.

BRIEF DESCRIPTION OF THE DRAWINGS

In drawings which illustrate the embodiments of the invention.

DESCRIPTION OF THE PREFERRED EMBODIMENT

The apparatus as illustrated comprises two exit pipes, $A^1$ and $A^2$, for the oxygen and hydrogen gases respectively. A water vapor trap is placed at the exit end of each of the pipes $A^1$ and $A^2$, to prevent water vapor to go to the gasmeter. Furthermore, two pumps are used to evacuate the gases. On the oxygen's side, the vacuum created is equal to three inches of water. On the hydrogen's side, it is of 6 to 7 inches of water. The principle lies in that the internal pressure must be less than that of the ambiant atmosphere to evacuate and recuperate the gases.

Two exit pipes $B^1$ and $B^2$ are joined together by a piece of transparent plastic tubing to determine the solution level in the pyramid.

A vertical pipe $C^1$ allows the introduction of a thermocouple to read at any moment the temperature of the solution, thus allowing to regulate the delivery of the cooling circulatory pump and to maintain a ideal temperature of 170°-175° F.

The cell is provided with two exit tubes $D^1$ and $D^2$ to prevent an overflood inside the pyramid. The aperture $D^1$ can stop the water level to go beyond the height of the electrodes, the overflow being decanted in a container coupled to the pyramidal cell via a secondary aperture $D^2$, above the water line. This essential security measure makes the cell almost perfectly air-tighten.

A water supply tube $E^1$, a tube $F^1$ for the exit of the circulatory pump and a tube $F^2$ for the return of the cooled water.

The tubes previously described are made of stainless steel 316. A total length of about sixty feet was used. Its internal diameter was about half an inch.

The apparatus described in the figures also comprises six tubes to carry the DC current supply rods to each of the electrodes. Tubes no. $G^1$, $G^2$ and $G^3$ go to the anode while tubes no. $G^4$, $G^5$ and $G^6$ go to the cathode. Each of the tubes $G^1$ to $G^6$ comprises a hose (chemical and acid hose) for the electric insulation of the whole module. The lead-in wires are made of 20% electrolytic copper and are covered first with nickel then with gold. For security reasons, a thermocouple is placed on one of the lead-in wires in order to be able to determine its temperature at any moment.

The apparatus as illustrated also comprises a counter electrode having the shape of an inverted triangle $H^1$, made of electrolytic copper, whose surface is equal to 29% of the surface of the cathode. This counter electrode is preferably placed at at least ⅜ of an inch of the east side of the cathode and is used to prevent any impurities to be attracted and deposited on the surface of the latter.

Figure 1:
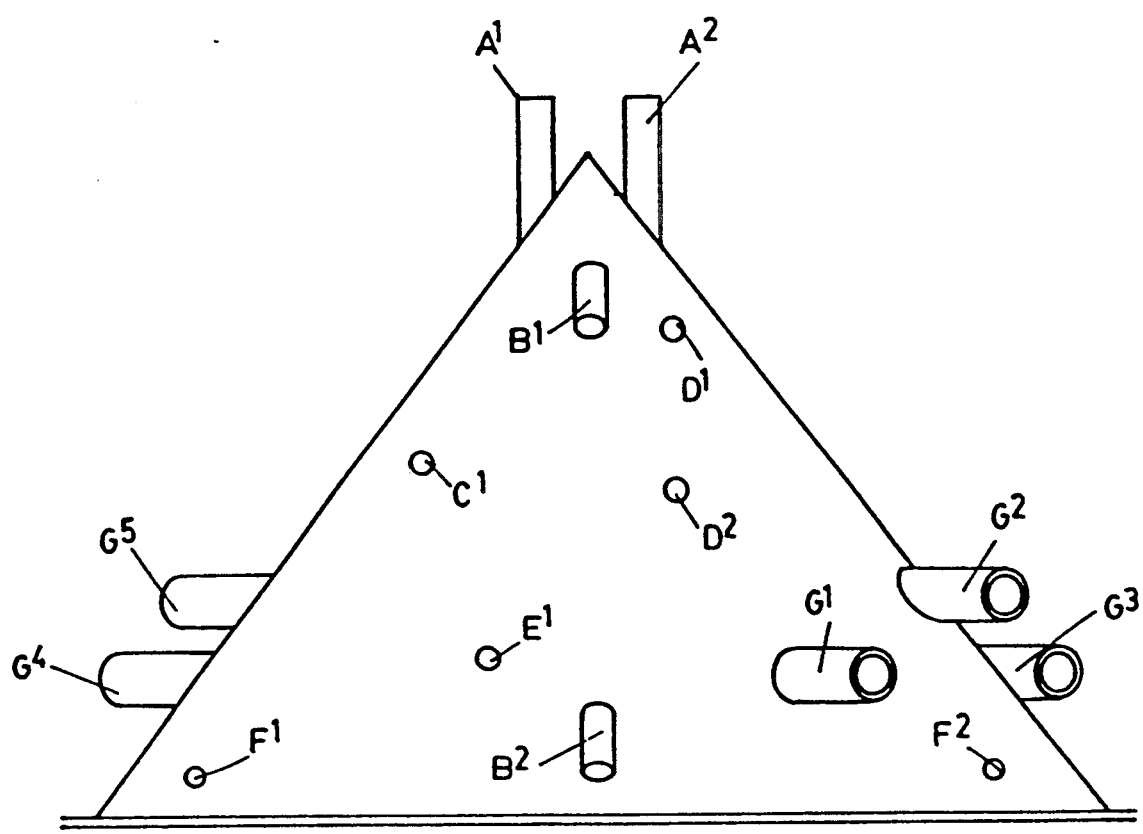
FIG. 1 shows a side view of the electrolysis cell.
Figure 2:
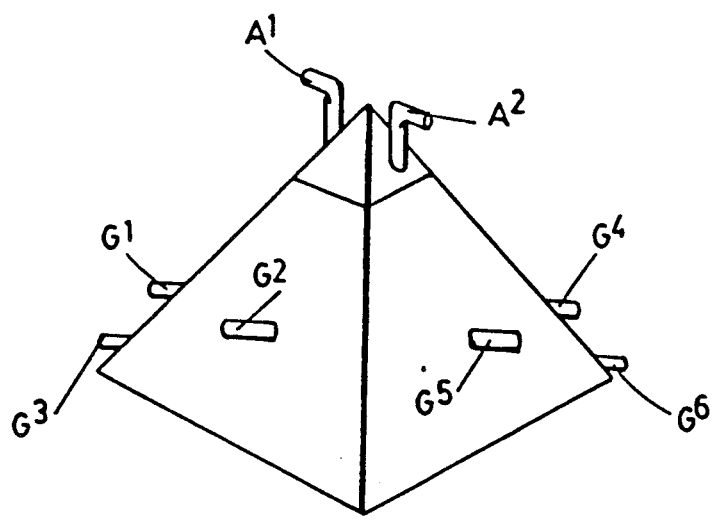
FIG. 2 shows a perspective view of the electrolysis cell.
Figure 3:
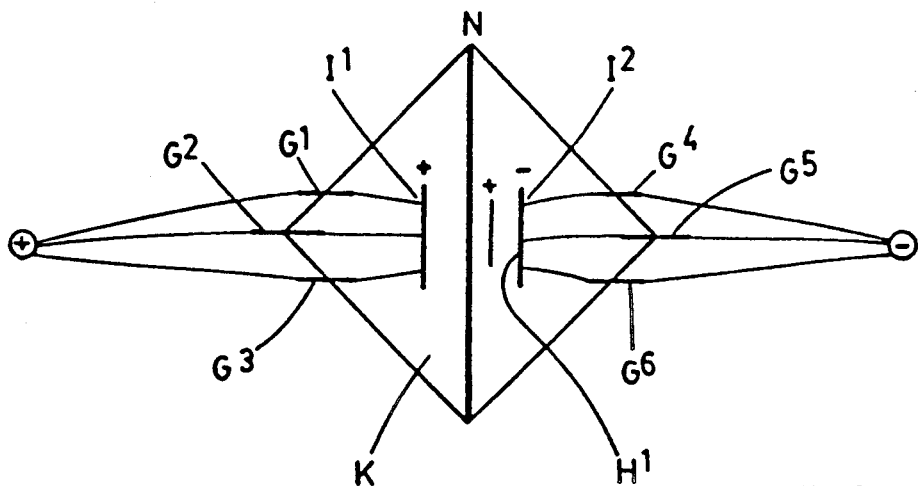
FIG. 3 shows an upper view of the electrolysis cell.
Figure 4:
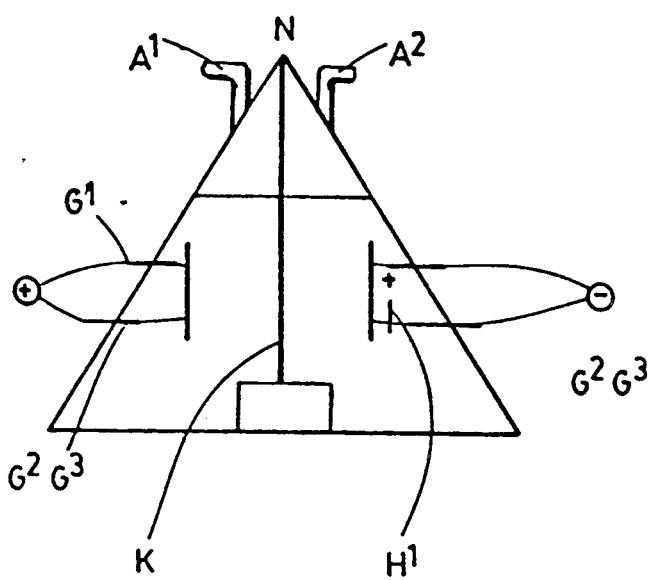
FIG. 4 shows an East-West side view of the electrolysis cell.
Figure 5:
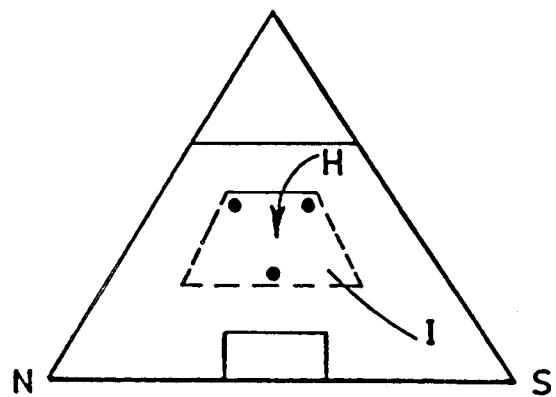
FIG. 5 shows a North-South side view of the electrolysis cell.

The electrolytic cell also comprises two steel plates $I^1$ and $I^2$ whose shape is illustrated in FIG. 5.

The bottom of the pyramid is solidly fixed on a square base with a seried of bolts.

The inside of the module is coated with TEFLON® in order to avoid a bridge effect between the walls of the pyramid and the electrodes.

An asbestos-made membrane (ALBION #107 FROTEX CLOTH 1/16®), $K^1$ is arranged inside the pyramid according to a diagonal line, separating the anode and cathode compartments. Only a fraction of the membrane going from its upper end down to about one inch below the floating line is covered with silicone. This precaution allows for a better separation of the gases by insuring a complete insulation of each compartment.

A current rectifier such as those used for the plating of metals is used to supply the wires with DC current. The current on each electrode is modulated in such a way that it is not incremented by more than 1,0 to 1,2 V every five minutes. When a voltage of 30 V has been reached, the time between each voltage increment is extended to 10 minutes. Corrosion of the electrodes and pollution of the electrodes is avoided by these simple precautions.

The electrodes and the wires are treated in order to be resistant to the strong electrical current used and to avoid corrosion.

The electrolyte solution is preferably a solution of potassium hydroxide having the following composition: 100 pounds of water for 21 pounds of potassium hydroxide. Different electrolytes can be used, at different compositions, according to the needs of the user.

The bottom of the pyramid is equipped with a magnetic stirrer. The constant agitation of the solutions prevents the accumulation of the oxygen and hydrogen formed at the electrodes. If such an accumulation were to be allowed, the voltage at the electrodes would have to be maintained at a low value.

It is also possible to avoid the problem of accumulation of gases on the electrodes by separating them at least 6 inches apart. This minimum separation is essential to obtain a good yield of gases produced and insures a good separation of the latter.

The following example is proposed to illustrate a preferred embodiment of the invention:

EXAMPLE

The electrolysis of a sodium hydroxide solution has been carried out using a stainless steel pyramidal-shape electrolysis cell whose anode and cathode compartments were separated by an asbestos membrane which was not fixed on the sides of the pyramid.

The electrodes were placed on each side of the membrane, in an orientation parallel to the membrane and perpendicular to the base of the pyramid. The electrodes were made of stainless steel and looked as well polished as a mirror.

Behind one of the electrodes and parallel to it, a copper counter-electrode was placed.

The upper part of the pyramid was collapsible to allow a good evacuation of the gases produced. The exit end for each of the gases was coupled with a bottle to skim the gases produced and to a cold water copper condenser to recuperate the gases.

Finally, a gas meter was placed before.

The inside of the pyramidal cell was insulated with vulcanized rubber and the whole unit was partially immersed in a water bath to allow for an adequate cooling of the Two sampling tubes for the analysis of the gases produced have been placed at the exit end of the cell.

After the gases have been skimmed, condensed and dried on silica gel, their oxygen content has been measured with a TAYLOR apparatus based on the paramagnetic properties of oxygen. As for the temperature of the cooling bath and of the electrodes, it has been carried out with thermocouples.

The applied amperage and voltage have been measured continually.

A first series of measures considered stable has been performed. The quantity of oxygen on each side indicated:

Hydrogen side: 25-28%
Oxygen side: 75-78%

A gas-chromatography analysis indicated:

| Hydrogen side: | $H_2$ | 60% |
|---|---|---|
|  | $O_2$ | 25% |
|  | $N_2$ | 15% |
| Oxygen side: | $H_2$ | 40% |
|  | $O_2$ | 44% |
|  | $N_2$ | 16% |

The amperage passing through the system was 287A. The gas volume measured at each of the exit ends of the cell was 7,6 ft$^3$ per hour.

A second series of measures, in more of less stable conditions, was also performed. The oxygen content on each side indicated:

Hydrogen side: 19-26%
Oxygen side: 49-54%

A gas chromatography analysis indicated:

| Hydrogen side: | $H_2$ | 71% |
|---|---|---|
|  | $O_2$ | 15.5% |
|  | $N_2$ | 13.5% |
| Oxygen side: | $H_2$ | 37% |
|  | $O_2$ | 45% |
|  | $N_2$ | 18% |

The amperage passing through the system was 462A and the volume of gas measured at the exit end of the cell was 6.8 ft$^3$ per hour.

The analysis of the deposit found at the bottom of the electrolytic cell revealed a large amount of copper oxide and copper hydroxide. This deposit came undoubtedly from the copper wires and the copper counter-electrode parallel to the steel electrodes.

As for the analysis of the residue coming from the skimming of the gases, the following results have been obtained:

Hydrogen side: The dosage of the solution was 11.4% KOH. After evaporation and drying at 550° C., the solid residue was 11.9% KOH.

Oxygen side: The dosage of the solution was 11.4% KOH. After evaporation and drying at 550° C., the solid residue was 11,4% KOH.

After being used for 24 hours, the electrodes have been cleaned out and still looked polished, without any observable sign of corrosion.

On the theoretical point of view, the electrolysis of water should yield twice as much hydrogen as oxygen. The volumes measured indicated that the quantity of gas produced was faintly identical on both sides of the electrodes, due to a lack of tightness of the membrane.

Taking into consideration both gases produced, a simple calculation showed that the mixed gas should be:

| First Experiment | | |
| --- | --- | --- |
| Hydrogen produced (H$_2$) | 34.5–4.1 | 50% |
| Oxygen produced (O$_2$) | 15.5–4.1 | 30.4% |
| Air | | 19.6% |
| Second Experiment | | |
| Hydrogen produced (H$_2$) | 30.25–4.2 | 54% |
| Oxygen produced (O$_2$) | 15.75–4.2 | 26.05% |
| Air | | 19.95% |

In both cases, the same quantity of air has been found, but the second experiment really showed twice as much hydrogen as oxygen. As for the first experience, it seems that a small quantity of hydrogen was lost.

Comparing the results of both experiments, the following data were obtained:

First Experiment
  Amperage: 287A
  Hydrogen produced: 7.6 ft$^3$
Second Experiment
  Amperage: 462A
  Hydrogen produced: 7.3 ft$^3$ The first experiment seems to give a much better yield than the second one. Furthermore, a current of 462A should produce 6.9 ft$^3$ of hydrogen at 0° C. and 760 mm Hg in normal electrolysis conditions.

The results of the experiments reported here show an extraordinary yield of gases by the pyramidal electrolysis cell in normal conditions of experimentation.

The embodiment of the invention in which exclusive property or privilege is claimed are defined as follows:

1. An apparatus for the electrolysis of a solution of an electrolyte, comprising a cell with an anode compartment and a cathode compartment separated by a membrane, the apparatus having an external shape of a pyramid, the membrane being oriented to extend perpendicular to the base of the pyramid and vertically along one of the diagonals of the base.

2. An apparatus as defined in claim 1, wherein the membrane is oriented relative tot he earth cardinal points in such a way that the membrane is in a north-south axis, the anode being on the west side and the cathode on the east side.

3. An apparatus as defined in claim 1, wherein the anode and cathode constitute electrodes, further comprising a current supply means for supplying current to each of said electrodes, each of said current supply means being a lead-in wire reaching a respective one of said electrodes at a 90° angle.

4. An apparatus as defined in claim 3, characterized in that the lead-in wire is made of three distinct parts each being connected to the respective electrode at points defining an inverted triangle.

5. An apparatus as defined in claim wherein the electrodes and each of the lead-in wires are resistant to the current applied by said current supply means.

6. An apparatus as defined in claim, wherein the lead-in wires are equipped with a thermocouple to measure the temperature of said wires.

7. An apparatus according to claim 1, further comprising a magnetic stirrer enclosed within the cell.

8. An apparatus according to claim 1, wherein the cell has an upper part which comprises an exit end for the gases.

9. An apparatus according to claim 1, further comprising means for facilitating evacuation of the gases produced during the electrolysis.

10. An apparatus according to claim 1, further comprising a current rectifier for supplying the wires with direct current.

11. An apparatus as defined in claim 1, further comprising tubing through a wall of the cell for connection with a circulatory pump.

12. An apparatus as defined in claim 1, further comprising a cooling coil tubing through a wall of the cell.

13. An apparatus as defined in claim 1, further comprising an insulator coating the inside of the cathode and anode compartments.

14. An apparatus as defined in claim 1, wherein one of the walls of the cell has a hole for supplying water.

15. An apparatus as defined in claim 1, wherein the cell has an opening.

16. An apparatus as defined in claim 1, wherein the cell has two apertures for enabling determination of the level of the electrolyte solution inside the cell.

17. An apparatus as defined in claim 1, further comprising a thermocouple for determining temperature of the electrolyte solution at any moment.

18. An apparatus as defined in claim 1, wherein the cell is adapted to contain an electrolyte solution made of 21 parts of potassium hydroxide for 100 parts water.

19. An apparatus as defined in claim 1, further comprising a counter-electrode placed behind the cathode.

20. An apparatus as defined in claim 19, wherein said counter-electrode is placed at ⅜ of an inch from the cathode.

* * * * *